Patented Sept. 27, 1949

2,483,124

UNITED STATES PATENT OFFICE 2,483,124

METHOD OF MAKING TERPENE RESIN

Frank W. Corkery, Crafton, and Samuel G. Burroughs, Pittsburgh, Pa., assignors to Pennsylvania Industrial Chemical Corporation, Clairton, Pa., a corporation of Pennsylvania No Drawing. Application July 6, 1948, Serial No. 37,305

6 Claims. (Cl. 260—93.3)

This invention relates to a method of making hard terpene resin polymers in good yield from alpha-pinene as a starting material.

In preparing a starting material for polymerization to produce hard terpene resin polymers, it recently has become commercial practice for the turpentine distiller to take a resin-forming cut of beta-pinene by distillation, because there is a sufficiently clean line of demarcation between the distillation range of beta-pinene and the other terpene constituents of the turpentine that it is possible by distillation to obtain commercially a grade of beta-pinene having an average purity of about 87%. A straight fractional distillation conducted on gum spirits of turpentine gives approximately 15% of forerunnings and tailings, approximately 25% of a comparatively pure beta-pinene fraction, and a fraction of about 60% alpha-pinene averaging above 90% in purity. Alpha-pinene, whether obtained from the distillation of gum spirits of turpentine or otherwise obtained, is not a good starting material for the production of hard terpene resin polymers.

Considering beta-pinene and alpha-pinene comparatively as sources of terpene resin, pure beta-pinene gives close to a 100% yield of terpene resin having a melting point above 130° C. (ball and ring). The commercial grade of beta-pinene, as above described, gives a yield of about 90% terpene resin having a melting point averaging about 115° C. When alpha-pinene is similarly subjected to polymerization there is obtained a yield of about 20% to 40% of resin solid at normal room temperature, melting about 50° C. to 70° C., a large proportion of the remaining starting material being polymerized to the form of terpene dimers, or heavy oil, and chemically associated dimers and monomers known as light oil. These comparisons are made on the basis of a polymerization procedure such as is disclosed in Burroughs Patent No. 2,335,912, and which operates to give a terpene resin which is of good color and unassociated with side products of polymerization. Such procedure, briefly stated, involves treatment with a metal halide Friedel and Crafts polymerization catalyst and particularly with anhydrous aluminum chloride, with agitation, and under conditions of heat abstraction which prevent a violent reaction surge.

All of the wholly hydrocarbon turpentine components which are unsaturated di-cyclic terpene hydrocarbons such as alpha-pinene and beta-pinene and mono-cyclic terpene hydrocarbons such as dipentene, terpinene and terpinolene, respond in common to the general formula $C_{10}H_{16}$ with but slight differences in their molecular structure. They differ in their index of refraction and in their molecular arrangement. Fundamentally it is our discovery that if alpha-pinene is treated under carefully controlled conditions with a suitable surface contact catalyst which presents a great contact area coupled with but slight acidity we are able to effect an isomerization or rearrangement of the alpha-pinene which gives such improvement in capacity for polymerization that we are able to obtain from it a good commercial yield of hard terpene resin polymers.

We are aware that isomerization processes have been practiced on alpha-pinene using catalyst clays of varied sort and that products of such isomerization procedures have been identified. Such prior isomerization treatments have not, however, been conducted so as to give a total body of monomeric isomerate, or rearranged alpha-pinene, which is capable under suitable conditions of giving a good yield of hard terpene resin polymers. The nature of our treatment and the considerations which make it critically effective to give a good starting material for polymerization will be explained.

It is accepted that camphene and the optically inactive dl-limonene, are well known isomerization products of alpha-pinene and are considered to result from separate reaction paths as follows:

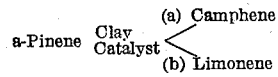

Of these two isomerization products we have found that camphene normally preponderates but that dl-limonene is a better starting material for polymerization than is camphene. In an isomerate in which about 10% of dimers have been formed during the isomerization procedure, the remaining content of the isomerate should be about 60% camphene and about 30% dl-limonene. Because of the superior capacity for polymerization possessed by the dl-limonene and because as will appear, better resin-forming results are obtained from the camphene by polymerizing it in admixture with the dl-limonene, apparently some copolymerization being involved, it is a matter of necessity to form and protect a maximum content of the dl-limonene in conducting the isomerization or rearrangement of the alpha-pinene. It is, however, a fact that the isomerates of alpha-pinene as previously produced are not good starting materials for polymerization to hard terpene resin polymers.

Camphene is an end product of the isomerization reaction and is not changed other than by polymerization if the conditions of the reaction cause overtreatment. If an overtreatment is caused one result is the formation of products boiling above 200° C. In proportion with the formation of such relatively high-boiling products the rearranged alpha-pinene, or alpha-pinene isomerate, produced by the treatment is deprived of capacity to polymerize to hard terpene resin polymers. We have, however, observed a secondary effect which is more serious and which results from the fact that dl-limonene is not an end product of the isomerization of alpha-pinene. We observed that, although the production of only a small proportion of high-boiling isomerization products does not assure good capacity of the isomerate to polymerize to hard terpene resin polymers, the production of a substantial content of such high-boiling products indicates that the distillate from them will exhibit relatively poor capacity for polymerization. We also observed that decrease in capacity usefully to polymerize increases disproportionately if the content of isomerization products boiling above 200° C. exceeds about 10% the weight of the original alpha-pinene. Explanation for this condition is found in the fact that dl-limonene is not itself an end product of the isomerization reaction but that the complete reaction proceeds as noted by Egloff, Hulla and Komarewsky in "Isomerization of Pure Hydrocarbons" page 140, as follows:

a-Pinene—limonene—terpinolene— Mixture of a-terpinene and -terpinene

The formation of products boiling above 200° C. is an indication of an overtreatment in which dl-limonene continues to isomerize to form terpinolene and terpinene. If the isomerization treatment results in a high proportion of the relatively high-boiling products, indicating that substantially all the dl-limonene has gone further to form terpinolene and terpinene, the most desirable remaining resin-forming content of the monomeric distillate boiling below 200° C. is camphene having moderate capacity for resin-forming polymerization.

The following example illustrates the relative capacity of camphene and dl-limonene to form hard terpene resin polymers under polymerizations which are identical and which may be taken as approximating optimum polymerization conditions. In the series of polymerizations shown, part 1 is a polymerization conducted on approximately pure camphene and part 7 represents a polymerization conducted on approximately pure dl-limonene. The intermediate runs are given in percentages of camphene, it being understood that the balance of the reaction mixture is dl-limonene identical with that which is the starting material in part 7. Part 1 and part 7 give the basis for calculating theoretical yields for each of the mixtures on the assumption that both constituents of the terpene blend were to polymerize in accordance with its own normal capacity without copolymerization.

*Example 1*

In all of the 7 exemplary runs included in this example 236 gms. of the terpene or terpene mixture were blended with 350 cc. of toluene. 12 gms. of aluminum chloride was used as catalyst, the aluminum chloride being added in increments spaced apart from 6 to 15 minutes in accordance with the ease of controlling the temperature of the mixture within the range of 40° C. to 45° C. The reaction mixture was agitated during the addition of the catalyst and for 1½ hours after all the aluminum chloride had been added. After completion of the reaction, the reaction mixture was neutralized and washed, was distilled for the removal of solvent and steam distilled for the removal of any oils which had been formed. The results of these runs were as follows:

| | Composition | Obtained S. P., °C. | Calculated S. P., °C. | Obtained Yield Per Cent | Calculated Yield Per Cent |
|---|---|---|---|---|---|
| 1 | 100% Camphene | 86.0 | 86.0 | 48.3 | 48.3 |
| 2 | 85% Camphene | 94.0 | 96.6 | 65.2 | 53.2 |
| 3 | 60% Camphene | 110.8 | 110.5 | 70.4 | 61.4 |
| 4 | 45% Camphene | 116.5 | 117.3 | 74.6 | 66.3 |
| 5 | 30% Camphene | 122.2 | 123.0 | 79.3 | 71.2 |
| 6 | 15% Camphene | 128.5 | 128.0 | 79.7 | 76.1 |
| 7 | 100% Dl-limonene | 132.5 | 132.5 | 81.0 | 81.0 |

The first conclusion which is apparent from the runs of this example is that comparatively dl-limonene is far superior to camphene as a starting material for hard resin-forming polymerization. This is shown by comparing the yields and softening points of the resins obtained in part 1 and in part 7 respectively. The intervening runs appear to show clearly that an unexpected copolymerization takes place between the camphene and the dl-limonene. Thus taking the softening points and yields of part 1 and part 7 as standard, it will be seen that a substantially higher yield of resin is obtained than would be calculated from the proportional yields of the individual terpene hydrocarbons. In part 2 in which the terpene blend consists 85% of camphene and 15% of dl-limonene the increase in obtained yield over calculated yield is greatest.

In conducting a treatment of alpha-pinene to produce mixtures or blends of camphene and dl-limonene, the object is therefore to obtain from the alpha-pinene blends which approximate as closely as possible the composition and capacity for polymerization of analogous arbitrarily prepared blends. That is, the object of the applicants' isomerization procedure is to effect such rearrangement of the alpha-pinene as to obtain a starting material for polymerization having a maximum content of camphene and dl-limonene monomers.

The attainment of the desired result, which is the formation of a good starting material for resin-forming polymerization to hard terpene resin polymers depends on what may be considered critical moderation in the conditions of the isomerization treatment. In one respect the factors defining such moderation are difficult of definition, because of the fact that newly distilled alpha-pinene is more susceptible to the isomerization treatment than is alpha-pinene which has become aged in storage. Whereas the aged alpha-pinene never gives results which are as good as those obtainable from newly distilled alpha-pinene, treatment may be conducted on the aged alpha-pinene under conditions of greater severity without disturbing the progress of the isomerization or rearrangement.

Generally to outline our method, we subject alpha-pinene to treatment with an active surface contact catalyst, fuller's earth dried at high temperature and in finely divided condition, at a temperature within the range of 0° C. to 130° C. for from 8 to 24 hours for fresh alpha-pinene. We have found a time of treatment of from 8 to 24 hours usually sufficient to effect the desired isomerization, or rearrangement of alpha-pinene, but that a longer period of treatment, as from 24 hours to 36 hours, frequently is desirable in treating an aged alpha-pinene or if the reaction is conducted at a particularly low temperature. If the character of the clay used in treating the alpha-pinene be suitable and the temperature of the treatment be sufficiently moderate with respect to the other control factors, there is no upper limit reasonably to be imposed on the duration of the treatment. In fact assurance of good results is best obtained by employing catalyst clay as hereinafter specified at a temperature in the lower region of the specified range and continuing the treatment for as long a time as necessary to obtain an observable desired result. The fuller's earth which is the surface contact catalyst for the isomerization is used in a quantity equal to from 5% to 50% the weight of the alpha-pinene and usually in a quantity equal to from 5% to 20% the weight of the alpha-pinene. The quantity of clay desirably used depends in large measure on the reactivity of the specific batch of alpha-pinene starting material and the reactivity of the specific clay. Adjustment frequently must be made in the total quantity of clay used and more particularly in the quantity and spacing of the increments in which the clay is added to the starting liquid, in order to obtain satisfactory results and we have found that the adjustment should be made in accordance with the observed progress of the isomerization reaction.

As to the catalyst clay, that clay is a fuller's earth of any specific sort which after a high temperature drying treatment for from 5 to 30 minutes at a temperature within the range of 225° C. to 300° C. has a pH value between 5.5 and 7; that is, a pH value between 5.5 and 6.6 inclusive. This clay when finely divided, that is of a fineness to pass through a screen having no less than 100 meshes to an inch, provides a catalyst the catalytic action of which can be considered to be primarily one of surface contact in distinction from catalysts depending solely on acid reaction for their catalytic effect.

Efficient drying substantially increases the surface contact effectiveness of the clay with only moderate increase in its effective total acidity. We have found that untreated fuller's earth initially has a pH value slightly below 7, as from 6.8 to 6.95, and as noted above after high temperature drying under the above specified conditions it has a pH value of from 5.5 to 6.6, and usually between 5.6 and 6.4 inclusive. The above pH values used as indications of total acidity are determined by agitating the clay with twice its weight of water and testing the slurry so formed with Gargille pH indicator paper.

We have found that indication of the progress of the reaction by which the alpha-pinene is rearranged is given most suitably by the aniline point of the reaction liquid as the treatment proceeds. By the A. S. T. M. aniline point method we use, the alpha-pinene starting liquids have an aniline point of 45.8° C. plus or minus 0.5° C. and the total product derived from the alpha-pinene by the isomerization treatment has an aniline point of from 35° C. to 38.5° C. A complete description of the aniline point method used in our determinations is found in A. S. T. M. Standard of 1946 Part III-A, pages 833 to 835 inclusive—A. S. T. M. Designation D 611-46 T.

An indication of an unduly severe treatment is for the aniline point to drop rapidly, and then for the aniline point of the reaction mixture to increase. Exemplary overtreatments, resulting in misdirection of the isomerization reaction may result from relatively high temperature conditions plus an unduly rapid addition of catalyst clay, may result from using a catalyst clay which has such acidity as to produce a reaction so violent as to lead away from good resin-forming properties in the isomerization product, or may result from a combination of factors leading to a reaction surge which is unchecked in time to prevent detriment to the resin-forming properties of the product.

During the progress of the reaction a variation which tends to the production of terpinene and terpinolene rather than the optically inactive dl-limonene is indicated by a drop in aniline point greater than 1.2° C. per hour. For a given temperature the catalyst clay should be added in increments so small and so widely spaced that the aniline point is lowered at a rate no higher than 1.2° C. per hour. If there is an observed tendency for the aniline point to increase after it has been below about 38.5° C., no further addition of clay should be made and the reaction should be quickly terminated. In carrying out the reaction, the best guide is so to regulate addition of the catalyst clay with respect to other conditions that aniline point does not drop at a rate faster than 1.2° C. per hour. As a corollary indication of satisfactory treatment, progressive increase in the refractive index over the refractive index of alpha-pinene is observable.

The following is typical of the relation of refractive index and aniline point in conducting an isomerization treatment under the conditions of our method.

| Refractive Index | A. S. T. M.—A. P. |
|---|---|
| 1.4655 | 45.8 |
| 1.4660 | 44.9 |
| 1.4670 | 43.8 |
| 1.4680 | 42.5 |
| 1.4690 | 41.4 |
| 1.4700 | 40 |
| 1.4710 | 39.9 |
| 1.4720 | 37.8 |
| 1.4730 | 36.3 |
| 1.4735 | 35.8 |

The merit in conducting the rearrangement of the alpha-pinene with checking as to aniline point is that the aniline point of the reacting liquid may be checked rapidly from time to time during the progress of the reaction and that addition of the catalyst clay may be terminated, or the effect of the clay may be moderated, by decreasing the quantity of the increments or by increasing the spacing of the additions before serious detriment to the properties of the isomerate is caused. The conditions are also subject to control by decreasing the temperature of the reacting liquid.

We have found it desirable to employ a reaction temperature of from 0° C. to 50° C. if fresh alpha-pinene is used as the starting material, in order to assure moderation in this factor of treatment; and to maintain a temperature of from 30° C. to 130° C. if aged alpha-pinene is used. The difference in temperature ranges with different conditions of the alpha-pinene is not, however, a critical factor. If the higher temperature range be used with fresh alpha-pinene, the conditions may be compensated by adding the catalyst clay in smaller increments and at longer intervals to maintain a rate no higher than 1.2° C. per hour in lowering of the aniline point. Similarly a greater quantity of clay added in larger and more closely spaced increments may be used in compensation if the lower temperature range be used in treating an aged alpha-pinene.

The following examples illustrate the application of our invention to freshly distilled alpha-pinene to obtain good yields of terpene resin of relatively high softening point.

Example 2

1800 cc. of freshly distilled alpha-pinene was treated with 270 gms. of finely divided fuller's earth dried at a temperature of 250° C. for a period of 5 minutes and having a pH value of 5.8. The catalyst clay was added gradually to the alpha-pinene over a period of about 4½ hours, the clay being added in an initial quantity of 50 gms. and then in 10 to 15 gm. increments at intervals spaced from 5 to 10 minutes. When the entire 270 gms. of clay had been added the reaction was allowed to continue for an additional 5 hours with agitation and the reaction liquid was settled and decanted. During the entire reaction time the temperature was held close to 20° C.

Taking a 100 cc. sample of the reaction product, which had an aniline point of 36° C., we distilled it to a vapor temperature of 200° C. at 750 mm. of mercury, obtaining 97% distillate and a 3% residue boiling above 200° C.

When subjected to polymerization with anhydrous aluminum chloride the undistilled remainder of the isomerization product gave a yield of 76.8% its weight of hard terpene resin polymers having a softening point (ball and ring) of 96° C.

As a result of the isomerization reaction an aniline point close to 45.8° C. of the initial alpha-pinene was lowered to 36° C. for the total reaction product and slightly lower for the distillate. During the progress of the isomerization reaction, the aniline point of the reaction was checked at 30 minute intervals and at no stage of the reaction did the aniline point drop at a rate exceeding 1.2° C. per hour.

Another satisfactory run may be exemplified as follows:

Example 3

1800 cc. of freshly distilled alpha-pinene was treated with 334 gms. of finely divided fuller's earth dried at 250° C. for 5 minutes and having a pH value of 6. The catalyst clay was added gradually to the alpha-pinene over a period of about 5 hours, the clay being added in a quantity of 50 gms. in the first 5 minutes and then in 5 to 20 gm. increments at intervals spaced from 5 to 15 minutes. When the entire 334 gms. of clay had been added, the reaction was allowed to continue for a total treating time of 14 hours and the reaction liquid was then settled and decanted. During the entire reaction time the temperature was held close to 30° C.

At the end of the reaction the aniline point of the reaction liquid was 36.3° C. as compared with an aniline point close to 45.8° C. for the original alpha-pinene. The aniline point of the reaction liquid was checked every ½ hour during the progress of the reaction and at no stage of the reaction did the drop in aniline point exceed 1.2° C. per hour.

Upon distilling 100 cc. of the reacted alpha-pinene at a maximum vapor temperature of 200° C. at 750 mm. of mercury, a distillate totalling approximately 93% the weight of the initial alpha-pinene was obtained with a residue distilling above 200° C. amounting to about 7%. The aniline point of the distillate was 35.8° C.

When subjected to polymerization with anhydrous aluminum chloride the undistilled remainder of the reaction product gave a yield of 77.3% its weight of hard terpene resin polymers having a softening point (ball and ring) of 93° C.

As other examples of what may be considered to be satisfactory practice the following are given:

Example 4

1800 cc. of freshly distilled alpha-pinene was agitated with 403 gms. of finely divided fuller's earth which had been dried for 5 minutes at a temperature of 250° C. and had a pH value of 6. The clay was added in an initial quantity of 50 gms. and then in 20 gm. increments spaced apart from 10 to 30 minutes during a period of 7 hours and agitation was continued for an additional period of 17 hours at the end of which the reaction liquid was settled and decanted. During the entire time of treatment the reaction temperature was held close to 30° C. The aniline point was checked every 30 minutes during the isomerization reaction and at no stage of the reaction did the aniline point of the reacting liquid drop faster than 1.2° C. per hour.

At the end of the reaction the aniline point of the reaction liquid was 36.8° C. as compared with an aniline point close to 45.8° C. for the original alpha-pinene.

Upon distilling 100 cc. of the reacted alpha-pinene at a maximum vapor temperature of 200° C. at 750 mm. of mercury, a distillate totalling 90% the weight of the initial alpha-pinene was obtained with a residue distilling above 200° C. amounting to about 10%.

When subjected to polymerization with anhydrous aluminum chloride the undistilled remainder of the reaction product gave a yield of 73.3% its weight of hard terpene resin polymers having a softening point (ball and ring) of 92° C.

Example 5

1500 cc. of aged alpha-pinene was agitated with 200 gms. of finely divided fuller's earth which had been dried at a temperature of 240° C. for 10 minutes and had a pH value of 6.7. The catalyst clay was added in an initial quantity of 50 gms. and then in 10 gm. increments at intervals of from 5 minutes to 15 minutes, and after all the clay had been added agitation was continued to give a total treating period of 36 hours. The reaction liquid was settled and decanted. During the progress of the reaction the temperature of the reaction liquid was between 47° C. and 110° C.

At the end of the reaction the aniline point of the reaction liquid was 36.5° C. as compared with an aniline point close to 45.8° C. for the original alpha-pinene. The aniline point of the reaction liquid was checked every ½ hour during the progress of the reaction and at no stage of the reaction was the drop in aniline point faster than 1.2° C. per hour.

The reaction product was distilled to a vapor temperature of 200° C., giving an 8% residue. A cut distilling from 158° C. to 180° C., equal to 80% the weight of the original alpha-pinene, was subjected to polymerization with anhydrous aluminum chloride. There was obtained a yield of 70.3% (based on the weight of the cut) of hard terpene resin polymers having a softening point (ball and ring) of 93° C.

It will be noted that the proportion of the product distilling above 200° C. was not great, although the temperature range was high, and that the yield of hard terpene resin polymers obtained from the reaction product was relatively low in consideration of the fact that the formation of high-boiling products was moderate. This is explained by the fact that the alpha-pinene subjected to treatment was not fresh, and that the long treating period and relatively high temperature served to give as good results as could be expected from the starting material, without misdirecting the reaction to the formation of undesired end products.

The following two examples illustrate departure from the method of our invention, resulting in unsatisfactory yields of hard terpene resin polymers with respect to the quantity of the initial alpha-pinene starting material.

Example 6

In this example 1500 cc. of fresh alpha-pinene was agitated with 80 gms. of fuller's earth dried at 230° C. for 10 minutes and having a pH value of 6.3. All the clay was added within 10 minutes. During a period of 1 hour the reaction temperature rose through the range of 45° C. to 125° C. In the neighborhood of 125° C. there was a very fast reaction with rapid drop of 2.2° C. in the aniline point of the reaction liquid, and the reaction was killed with water.

The reaction product was distilled to a vapor temperature of 200° C. at 750 mm. of mercury, leaving a residue of 16.5% distilling higher than 200° C. A cut distilling within the range of 159° C. to 180° C., amounting to 73.2% the weight of the alpha-pinene was taken and was subjected to polymerization with anhydrous aluminum chloride. There was obtained from the polymerization 56% (based on the cut) of hard terpene resin polymers having a softening point (ball and ring) of 80° C.

In this example the relatively poor results in providing a good starting material for resin-forming polymerization are attributable to the fact that the isomerization was carried beyond the stage of optimum results, to give a proportionally great formation of products having relatively poor capacity for polymerization as compared with dl-limonene.

Example 7

In this example 1000 cc. of fresh alpha-pinene was agitated with 55 gms. of finely divided clay, which by acid treatment had been given a pH value of 3.2. This clay was added in an initial quantity of 25 gms. and then in 5 gm. increments spaced apart 10 to 15 minutes. The temperature was held within the range of 50° C. to 66° C. for a total treating period of 2½ hours. Toward the end of the treating period the reaction became so violent as to be misdirected, as indicated by an abrupt drop of 3° C. in the aniline point of the reaction liquid and the reaction was killed with water. The aniline point of the product was 41.5° C.

The reaction product was distilled to a vapor temperature of 200° C. at 750 mm. of mercury, leaving a residue of 24% distilling above 200° C. A cut distilling within the range of 162° C. to 180° C. was taken and was subjected to polymerization with anhydrous aluminum chloride. There was obtained from the polymerization a yield of 65% (based on the cut) of hard terpene resin polymers having a softening point (ball and ring) of 78° C. The cut distilling within the range of 162° C. to 180° C. was equal to 60% the weight of the total isomerate. The yield of hard resin was therefore 39% on the basis of the alpha-pinene.

The conditions of the isomerization procedure of this example were such as to have given a rearranged product having good capacity for resin-forming polymerization if a prepared clay having a suitable pH value had been used instead of the relatively acidic clay actually employed as the catalyst. That clay because of its tendency to cause an unduly violent reaction greatly impaired the resin-forming capacity of the isomerate.

Example 8

This example is another instance in which the total reaction product is distilled and a cut of the distillate is subjected to polymerization. 1800 cc. of fresh alpha-pinene was agitated with 344 gms. of finely divided fuller's earth which had been dried for 5 minutes at a temperature of 300° C. and had a pH value of 5.7. The clay was added in 5 to 15 gm. increments at intervals of 5 to 15 minutes and the reaction temperature was held close to 50° C. for a total treating period of 9½ hours.

During the progress of the reaction the aniline point of the reaction liquid was taken at ½ hour intervals and the aniline point of the reaction liquid did not drop faster than 1.2° C. per hour at any stage of the reaction. The aniline point of the reaction product was 36.1° C.

The total reaction product was distilled up to 200° C. vapor temperature at 750 mm. of mercury. The distillate had an aniline point of about 35.6° C. As a result of the distillation there was obtained 90% of a cut distilling in the range of 162° C. to 176° C. and 7.4% of residue distilling above 200° C. On subjecting the cut to polymerization with anhydrous aluminum chloride there was obtained a yield (based on the cut) of 73% of hard terpene resin polymers having a softening point (ball and ring) of 95° C.

In all the foregoing examples an identical polymerization procedure was followed in producing hard terpene resin polymers from the isomerized, or rearranged, alpha-pinene. In the polymerization process we used a treating vessel organized for good contact between a reaction liquid and a catalyst, and equipped with temperature controlling means by the use of which the contents of the vessel may be treated under heat-supplying or heat-abstracting conditions by circulation of steam, water, brine, or other heat-transfer medium. Placing about 45 parts by weight of the starting material prepared by rearrangement of the alpha-pinene, in the polymerizer, we added about 50 parts by weight of toluol as exemplary of an inert diluent, and more specifically as exemplary of the aromatic hydrocarbon solvent diluents distilling below 200° C. at normal atmospheric pressures. Anhydrous aluminum chloride was added slowly with agitation of the reaction mixture. Addition of the catalyst was begun at normal room temperature, and as the heat of the polymerization reaction tended to raise the temperature of the reaction mixture, the temperature was held within the approximate range of 20° C. to 60° C. by heat-abstracting circulation. The temperature was maintained within that range during the entire polymerization reaction. The catalyst in a total quantity equal to 5% the weight of the terpene starting material was added at intervals during a period of about 2 hours, as the temperature conditions of the reaction mixture indicated that catalyst addition might be made without causing a reaction surge. We have found that such period of catalyst addition conveniently is made longer or shorter in accordance with the efficiency of the cooling system with which the polymerizing vessel is equipped. Agitation was in each instance continued for from 2 to 3 hours after the addition of catalyst had been completed.

At the end of the polymerization procedure the reacted material was washed with water and was neutralized to a pH of 6 or 7 with sodium carbonate. The mixture then was allowed to settle and the water was run off. The washed solution was distilled for the removal and recovery of diluent and any unreacted starting material, and to separate dimers from the higher polymers formed by the polymerization. This latter distillation was conducted at a temperature of about 250° C. to 260° C. with steam to obtain a maximum melting point for the resin formed in the polymerization treatment.

Referring to the procedure of polymerization it is to be understood that variations in the conditions of the process may be used. Thus the temperature at which the polymerization reaction is conducted is not limited to the range of 20° C. to 60° C. employed above, but may range substantially lower or substantially higher without affecting the mechanism of the polymerization, other variables being proportionately adjusted where desirable. Such limitation on the employable temperature range as exists results from physical rather than chemical requirements of the polymerization process. Thus the temperature should not range so low that a high viscosity of the reaction mixture interferes with agitation or otherwise inhibits adequate contact of the polymerizable material and the catalyst. The upper limit of temperature will vary with the efficiency of the cooling system employed, higher temperatures being safe with a cooling system having particularly good ability to check temperature surges than are safe when the cooling system is less efficient. With cooling systems of the commoner sort we prefer to hold an upper temperature limit of about 60° C. to 70° C. to insure against temperature surges which might carry to a point of dangerous foaming and evolution of vapors, but if the cooling system be highly efficient we may conduct the polymerization at temperatures as high as 100° C. The effect of reaction temperature on the formation of hard resin polymers from rearranged alpha-pinene as a starting material is not critical. Thus 20° C. is not to be taken as a positive lower temperature limit for the polymerization reaction, but temperatures as low as −30° C. may be utilized if so desired. Temperatures substantially below 0° C. do, however, require increased refrigeration and tend to cause the polymerization reaction to take place more slowly.

As to the quantity of catalyst employed in using anhydrous aluminum chloride and its functionally identical equivalent aluminum bromide, the quantity of catalyst desirably is within the range of 2% to 15% the weight of the rearranged alpha-pinene subjected to polymerization. In general the quantity of catalyst employed is adjustable with other factors, such as reaction temperature and the speed with which it is desired to complete the polymerization relation. It may be observed generally that in large scale operations a lesser quantity of catalyst is effective to complete the reaction in a given time and at a given temperature than is the case with laboratory or pilot scale operations.

If one of the metal halide Friedel and Crafts polymerization catalysts be used other than aluminum chloride and aluminum bromide, desirably such catalyst is used in greater quantity than the aluminum chloride and aluminum bromide. Whereas the other acid-reacting metal halide polymerization catalyst such as zirconium chloride, boron fluoride, titanium chloride, tin chloride, antimony chloride and zinc chloride exert a catalytic action on the rearranged alpha-pinene, the catalytic effect of aluminum chloride and aluminum bromide is so far superior that their use save in cases of necessity is definitely indicated. We have established that the difference in catalytic effectiveness between aluminum chloride and aluminum bromide is negligible.

It will be seen from the foregoing disclosure as to the polymerization characteristics of the rearranged alpha-pinene that such material is a good starting material for polymerization when it results from an isomerization action so controlled that the product of the isomerization is in adequate measure a blend of camphene and dl-limonene. Although a good starting material for polymerization, the rearranged alpha-pinene differs from beta-pinene in that its response to catalytic stimulus is not so broad, many catalysts which may be used effectively in promoting the polymerization of beta-pinene being substantially less effective in promoting polymerization in the blend of camphene and dl-limonene forming the effective content of the rearranged alpha-pinene. As shown above, however, we are able to obtain by practice of our method good yields of hard terpene resin polymers from an initial alpha-pinene which in itself is a poor starting material for resin-forming polymerization.

Returning to the controlled isomerization treatment by which we obtain our starting material for resin-forming polymerization, it has been explained that the ultimate control involved in that procedure is to bring the aniline point of the reaction liquid progressively from about 45.8° C. the A. S. T. M. D 611-46-T aniline point for alpha-pinene to below a final mixed aniline point of 38.5° C. for the isomerate, without a drop of more than 1.2° C. per hour in aniline point during the reaction. As above noted, there is a progressive rise in refractive index which is correlated with progressive drop in aniline point, and an abrupt rise in refractive index during the progress of the reaction likewise is an indication that the reaction is being misdirected.

With careful additions of catalyst clay the isomerization reaction thus is brought from an initial aniline point which as an average for freshly distilled alpha-pinene is close to 45.8° C. to an aniline point within the range of 35° C. to 38.5° C., and most desirably within the range of 35.5° C. to 38° C. All the catalyst clay having been added and the aniline point of the reaction liquid having approached 38.5° C., temperature control can be used to maintain the moderation of the reaction and to avoid destructive surges in arriving at the desired condition of the reaction liquid. It should be noted that the aniline point of the isomerate within the indicated desired range does not give of itself positive assurance that a rearranged alpha-pinene having good capacity for polymerization has been produced. This is because certain products resulting from misdirection of the treatment which have good solvent power, but which have far less capacity for polymerization than dl-limonene, fall within the defined aniline point range. That defined aniline point range does, however, indicate the point at which the action should be terminated; and if the reaction has proceeded smoothly under such control conditions that the designated aniline point range is not arrived at by an abrupt drop at any stage of the treatment, in such case the capacity of the rearranged alpha-pinene for polymerization is good and the results of the polymerization will be as above indicated. It may be noted that best assurance of good results is obtained by using an alpha-pinene which has been freshly distilled within about 48 hours of its use as the starting material for rearrangement. An aged alpha-pinene never responds as well as freshly distilled alpha-pinene to the isomerization treatment, and in promoting reaction in an aged alpha-pinene there is greater danger of misdirection by abrupt violent action under tendencies for the reaction stimuli to become cumulative under the necessarily long continuance of the treatment.

It has been explained that the chief control element and the one which is most certainly under the operator's control is the addition of the catalyst clay in accordance with observed aniline point of the reacting liquid as the reaction proceeds. We have found that in order to obtain maximum control it is important that the catalyst clay be prepared for use by an adequate drying operation which gives uniformity in the catalytic effect of the clay. If the drying operation is inadequate so that the clay retains some moisture and is otherwise in a condition which does not develop its full catalytic effect, the clay does not adequately promote the isomerization reaction at low temperature. Moisture being present a high temperature sufficient to drive off the moisture from the clay results in an undesirable reaction surge which detracts greatly from the results of the treatment. A high temperature treatment not only drives off free moisture but apparently frees the clay from combined water, greatly increasing its catalytic effect. It has been explained that the clay we use in our process is a fuller's earth which has been made reactive solely by heat treatment. Such clay initially has a pH value slightly below 7 and when subjected for a short period of time to high temperature has a pH value between 5.5 and 6.6. Most desirably the fuller's earth is brought by heat treatment to a pH value of 5.6 to 6.4 inclusive. As disclosed above, such moderate reduction in pH value can be effected, without more, by subjecting a fuller's earth for from 5 to 30 minutes to a temperature of from 225° C. to 300° C.

It should be understood that the key to the rearrangement of the alpha-pinene which gives a good starting material for resin-forming polymerization lies in the moderation of the isomerization treatment. By practicing such moderation under observable conditions, the desired result is obtained.

Having disclosed preferred practice under our invention, it is to be understood that such practice is susceptible of modification in various particulars within the scope of the appended claims.

Throughout the specification "aniline point", where not specifically qualified by the method of its determination, is to be understood as determined by the A. S. T. M. D 611-46 T aniline point method. Where not specifically qualified in the specification, "softening point" is to be understood as determined by the ball and ring method of softening point determination. Where not specifically qualified in the specification, distillation temperatures are to be understood as taken at 750 mm. of mercury. Where not specifically qualified "pH value" is to be understood as determined by the Gargille paper test which has been noted.

The application herein is a continuation-in-part of our applications Serial No. 455,624, filed August 21, 1942; Serial No. 531,504, filed April 17, 1944; and Serial No. 531,506, filed April 17, 1944, all of which have become abandoned.

We claim as our invention:

1. The method of making hard terpene resin polymers from alpha-pinene by treating the said alpha-pinene with fuller's earth having a pH value of 5.5 to 6.6 inclusive which has been heat treated for from 5 to 30 minutes at a temperature of from 225° C. to 300° C. to bring the said alpha-pinene by molecular rearrangement to an A. S. T. M. D 611-46 T aniline point between 35° C. and 38.5° C. inclusive while controlling the reaction to a rate of aniline point drop no greater than 1.2° C. per hour, and effecting polymerization of said rearranged alpha-pinene by bringing the said terpene liquid in the presence of an inert solvent diluent for the polymers thereof into reactive contact with an acid acting metal halide catalyst selected from the group consisting of aluminum chloride and aluminum bromide, to form hard terpene resin polymers in solution, and recovering the terpene resin polymers so formed.

2. The method of making hard terpene resin polymers from alpha-pinene by treating the said alpha-pinene with fuller's earth having a pH value of 5.5 to 6.6 inclusive which has been heat treated for from 5 to 30 minutes at a temperature of from 225° C. to 300° C. to bring the said alpha-pinene by molecular rearrangement to an A. S. T. M. D 611-46 T aniline point between 35° C. and 38.5° C. inclusive while controlling the reaction to a rate of aniline point drop no greater than 1.2° C. per hour, and effecting polymerization of said rearranged alpha-pinene by bringing the said terpene liquid in the presence of an inert solvent diluent for the polymers thereof into reactive contact with aluminum chloride catalyst to form hard terpene resin polymers in solution, and recovering the resin polymers so formed.

3. The method of making hard terpene resin polymers from alpha-pinene by treating the said alpha-pinene with fuller's earth having a pH value of 5.5 to 6.6 inclusive which has been heat treated for from 5 to 30 minutes at a temperature between 225° C. to 300° C. to bring the said alpha-pinene by molecular rearrangement to an A. S. T. M. D 611-46 T aniline point between 35° C. and 38.5° C. inclusive while controlling the reaction to a rate of aniline point drop no greater than 1.2° C. per hour, and effecting polymerization of said rearranged alpha-pinene by bringing the said terpene liquid in the presence of an inert solvent diluent for the polymers thereof into reactive contact with aluminum bromide catalyst to form hard terpene resin polymers in solution, and recovering the resin polymers so formed.

4. The method of making hard terpene resin polymers from alpha-pinene by treating the said alpha-pinene with fuller's earth having a pH value of 5.6 to 6.4 inclusive to bring the said alpha-pinene by molecular rearrangement to an A. S. T. M. D 611-46 T aniline point between 35.5° C. and 38° inclusive while controlling the reaction to a rate of aniline point drop no greater than 1.2° C. per hour, and effecting polymerization of said rearranged alpha-pinene by bringing the said terpene liquid in the presence of an inert solvent diluent for the polymers thereof into reactive contact with an acid acting metal halide catalyst selected from the group consisting of aluminum chloride and aluminum bromide, to form hard terpene resin polymers in solution, and recovering the terpene resin polymers so formed.

5. The method of making hard terpene resin polymers from alpha-pinene by treating the said alpha-pinene with fuller's earth having a pH value of 5.6 to 6.4 inclusive to bring the said alpha-pinene by molecular rearrangement to the A. S. T. M. D 611-46 T aniline point between 35.5° C. and 38° C. inclusive while controlling the reaction to a rate of aniline point drop no greater than 1.2° C. per hour, and effecting polymerization of said rearranged alpha-pinene by bringing the said terpene liquid in the presence of an inert solvent diluent for the polymers thereof into reactive contact with aluminum chloride catalyst to form hard terpene resin polymers in solution, and recovering the terpene resin polymers so formed.

6. The method of making hard terpene resin polymers from alpha-pinene by treating the said alpha-pinene with fuller's earth having a pH value of 5.6 to 6.4 inclusive to bring the said alpha-pinene by molecular rearrangement to an A. S. T. M. D 611-46 T aniline point between 35.5° C. and 38° C. inclusive while controlling the reaction to a rate of aniline point drop no greater than 1.2° C. per hour, and effecting polymerization of said rearranged alpha-pinene by bringing the said terpene liquid in the presence of an inert solvent diluent for the polymers thereof into reactive contact with aluminum bromide catalyst to form hard terpene resin polymers in solution, and recovering the terpene resin polymers so formed.

FRANK W. CORKERY.
SAMUEL G. BURROUGHS.

REFERENCES CITED

The following references are of record in the file of this patent:

UNITED STATES PATENTS

| Number | Name | Date |
| --- | --- | --- |
| 2,264,774 | Sheehan | Dec. 2, 1941 |